(12) United States Patent
Marupaduga et al.

(10) Patent No.: US 10,721,586 B2
(45) Date of Patent: Jul. 21, 2020

(54) CONTROL OVER MULTIPLE USER MULTIPLE INPUT MULTIPLE OUTPUT (MU-MIMO) BY DEVICE TYPE AND LOCATION

(71) Applicant: Sprint Communications Company L.P., Overland Park, KS (US)

(72) Inventors: Sreekar Marupaduga, Overland Park, KS (US); Rajveen Narendran, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 70 days.

(21) Appl. No.: 16/196,639

(22) Filed: Nov. 20, 2018

(65) Prior Publication Data

US 2020/0162837 A1 May 21, 2020

(51) Int. Cl.
*H04W 4/021* (2018.01)
*H04W 76/27* (2018.01)
(Continued)

(52) U.S. Cl.
CPC .......... *H04W 4/021* (2013.01); *H04B 7/0452* (2013.01); *H04W 64/00* (2013.01); *H04W 76/27* (2018.02); *H04W 80/02* (2013.01)

(58) Field of Classification Search
CPC ........ H04B 7/00; H04B 7/063; H04B 7/0632; H04B 7/0634; H04B 7/0686; H04B 17/336; H04B 7/0413; H04B 7/0874; H04B 7/0465; H04B 17/24; H04B 7/0452; H04B 7/0417; H04B 7/212; H04B 7/02; H04B 7/0684; H04B 7/0613; H04B 7/0639; H04B 7/065; H04B 7/0478; H04M 1/00; H04W 72/1231; H04W 17/24; H04W 72/04; H04W 8/24; H04W 72/046; H04W 84/12;
(Continued)

(56) References Cited

U.S. PATENT DOCUMENTS 7,649,831 B2   1/2010   Van Rensburg et al.
8,059,609 B2   11/2011  Kim et al.
(Continued)

FOREIGN PATENT DOCUMENTS

WO    2017132629 A1    8/2017

*Primary Examiner* — Hardikkumar D Patel (57) ABSTRACT

A wireless communication network enhances Multiple Input Multiple Output (MIMO) for wireless user devices that have multiple device types. The wireless communication network has wireless access points that store MIMO geofences for the device types. The wireless access points select MIMO geofences for the wireless user devices based the device types. The wireless access points exchange Single User (SU) MIMO signals and Multiple User (MU) MIMO signals with the wireless user devices based on the selected MIMO geofences and device locations. The wireless access points transfer MIMO information characterizing the exchange of the MU-MIMO signals. A MIMO control system processes the MIMO information to determine geofence modifications based on MU-MIMO gains for the device types at the device locations. The MIMO control system transfers the geofence modifications to the wireless access points. The wireless access points update their MIMO geofences based on the geofence modifications.

18 Claims, 9 Drawing Sheets

(51) Int. Cl.
*H04B 7/0452* (2017.01)
*H04W 64/00* (2009.01)
*H04W 80/02* (2009.01)

(58) Field of Classification Search
CPC ..... H04W 52/325; H04W 52/16; H04W 4/00;
H04W 4/021; H04W 76/27; H04W 64/00;
H04W 80/02; H04L 25/0224; H04L
25/0204; H04L 1/1812; H04L 1/1887;
H04L 1/06; H04L 27/2608; H04L 1/1854;
H04L 1/0026; H04L 1/0009; H04L
25/03343; H04L 1/0003; H04L
2001/0093; H04L 1/0029; H04L 27/2601;
H04J 11/00
See application file for complete search history.

(56) References Cited

U.S. PATENT DOCUMENTS

| | | | |
|---|---|---|---|
| 8,271,043 B2 | 9/2012 | Kim et al. | |
| 8,553,795 B2* | 10/2013 | Xu | H04B 7/0684 |
| | | | 375/267 |
| 8,902,921 B2 | 12/2014 | Liu et al. | |
| 9,769,828 B2* | 9/2017 | Kaushik | H04B 7/0417 |
| 2008/0132281 A1* | 6/2008 | Kim | H04B 7/063 |
| | | | 455/562.1 |

* cited by examiner

CONTROL OVER MULTIPLE USER MULTIPLE INPUT MULTIPLE OUTPUT (MU-MIMO) BY DEVICE TYPE AND LOCATION

TECHNICAL BACKGROUND

Wireless communication networks serve wireless user devices with mobile data services like voice calling, internet access, media streaming, and software downloading. The wireless data networks have wireless access points that exchange data over the air with the wireless user devices. To extend the range of the mobile data services, the wireless communication networks deploy wireless relays between the wireless user devices and the wireless access points. The wireless user devices, wireless access points, and wireless relays use resource blocks of frequency spectrum and time period for their wireless communications.

The wireless user devices, wireless access points, and wireless relays also use Multiple Input Multiple Output (MIMO) to communicate over the wireless resource blocks. MIMO utilizes multiple antennas at the transmitter and/or receiver to transmit wireless resource blocks over parallel wireless signals. MIMO may beamform parallel wireless signals for reliable multipath transmission of a wireless resource block. MIMO may bond parallel wireless signals that transport different data to increase the data rate of the wireless resource block.

With Single-User (SU) MIMO, one wireless access point and one wireless user device exchange dedicated wireless resource blocks that are not shared with other wireless user devices. With Multiple-User (MU) MIMO, the wireless access point and two wireless user device exchange shared wireless resource blocks that are used by both of the wireless user devices. MU-MIMO uses beamforming to maintain data separation for the wireless user devices in the wireless resource blocks. MU-MIMO has better spectral efficiency than SU-MIMO.

Unfortunately, many wireless user devices do not adequately support MU-MIMO. For a given wireless user device, some types of the device may not properly support MU-MIMO while other types of that same device adequately support MU-MIMO. Wireless communication networks are not configured to efficiently and effectively support MU-MIMO given the myriad of wireless user devices and device types.

TECHNICAL OVERVIEW

A wireless communication network enhances Multiple Input Multiple Output (MIMO) for wireless user devices that have multiple device types. The wireless communication network has wireless access points that store MIMO geofences for the device types. The wireless access points select MIMO geofences for the wireless user devices based the device types. The wireless access points exchange Single User (SU) MIMO signals and Multiple User (MU) MIMO signals with the wireless user devices based on the selected MIMO geofences and device locations. The wireless access points transfer MIMO information characterizing the exchange of the MU-MIMO signals. A MIMO control system processes the MIMO information to determine geofence modifications based on MU-MIMO gains for the device types at the device locations. The MIMO control system transfers the geofence modifications to the wireless access points. The wireless access points update their MIMO geofences based on the geofence modifications.

DETAILED DESCRIPTION

Figure 1:
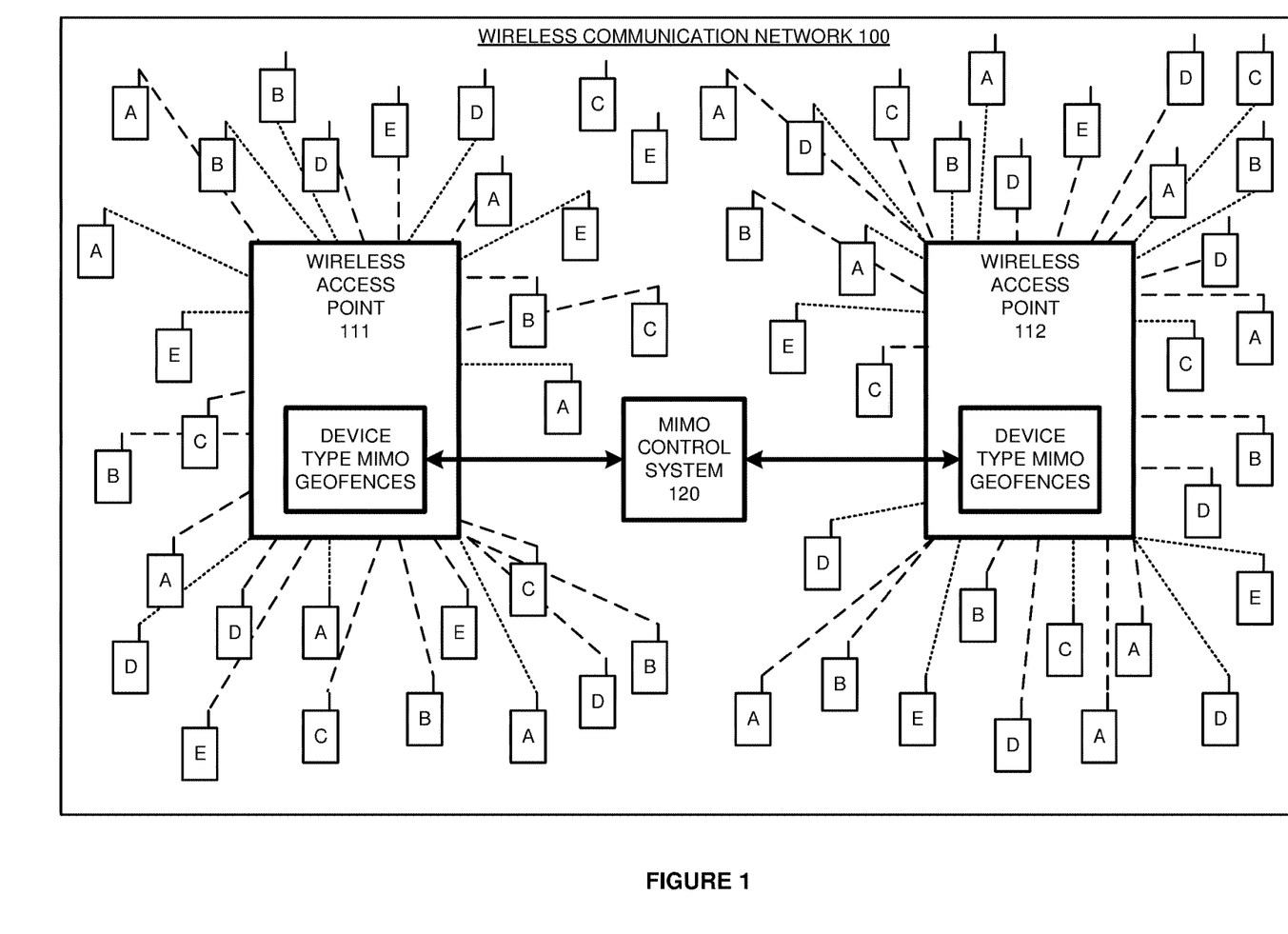
FIG. 1 illustrates a wireless communication network that optimizes Multiple Input Multiple Output (MIMO) for different types of wireless user devices.

FIG. 1 illustrates wireless communication network 100 to optimize Multiple Input Multiple Output (MIMO) for different types of wireless user devices. Wireless communication network 100 comprises wireless access points 111-112 and MIMO control system 120. The wireless user devices and wireless access points 111-112 communicate using Fifth Generation New Radio (5GNR), Long Term Evolution (LTE), Institute of Electrical and Electronic Engineers (IEEE) 802.11 (WIFI), or some other wireless communication protocol. In addition, the wireless user devices and wireless access points 111-112 communicate using Single User MIMO (SU-MIMO) and/or Multiple User MIMO (MU-MIMO). On FIG. 1, SU-MIMO links are represented by dotted lines, and MU-MIMO links are represented by dashed lines. FIG. 1 is a snapshot and the SU-MIMO and MU-MIMO links may change as the wireless user devices move around. The number of wireless user devices, MIMO formats, and wireless access points has been restricted for clarity in this illustrative example.

The wireless user devices comprise computers, phones, headsets, graphic displays, sensors, transceivers, or some other wireless communication apparatus. Exemplary device types comprise device manufacturer and model, component manufacturer and model, operating system and version, power rating, carrier aggregation version, antenna rank, transmission mode, wireless relay device, mobile device, airborne device, vehicle device, drone device, and the like. Representative device types are indicated on FIG. 1 by the letters by A, B, C, and D—and the number of device types may vary from this example.

The wireless user devices comprise wireless transceiver circuitry and baseband circuitry. The wireless transceiver circuitry comprises antennas, modulators, amplifiers, filters, digital/analog interfaces, processing circuitry, memory circuitry, firmware/software, and bus circuitry. The wireless transceiver circuitry uses 5GNR, LTE, WIFI, or some other wireless communication protocol. The baseband circuitry comprises processing circuitry, memory circuitry, software, bus circuitry, and transceiver circuitry. The memory circuitry stores and the processing circuitry executes operating systems, user applications, and network applications.

Wireless access points 111-112 could be base stations, hotspots, small cells, or some other wireless network transceivers. Wireless access points 111-112 comprise wireless transceiver circuitry and baseband circuitry. The wireless transceiver circuitry comprises antennas, modulators, amplifiers, filters, digital/analog interfaces, processing circuitry, memory circuitry, firmware/software, and bus circuitry. The transceiver circuitry uses 5GNR, LTE, WIFI or some other wireless network protocol. The baseband circuitry comprises processing circuitry, memory circuitry, software, bus circuitry, and network transceiver circuitry. The memory circuitry stores and the processing circuitry executes operating systems and network applications.

The network applications process MIMO geofences that indicate SU-MIMO or MU-MIMO per device type and location to select SU-MIMO or MU-MIMO for individual wireless user devices. The network applications transfer MIMO information to MIMO control system 120 that indicates device type, device location, MU-MIMO gain, and possibly SU-MIMO gain. The network applications receive geofence modifications from MIMO control system 120 responsive to the MIMO information and update their MIMO geofences based on the geofence modifications.

MIMO control system 120 and wireless access points 111-112 communicate over one or more data links and/or networks. MIMO control system 120 comprises processing circuitry, memory circuitry, bus circuitry, transceiver circuitry, and software. The memory circuitry stores and the processing circuitry executes an operating system and MIMO applications. The MIMO applications process MIMO information from wireless access points 111-112 to generate geofence modifications. The MIMO applications transfer the geofence modifications to wireless access points 111-112.

For example, the MIMO applications may change an SU-MIMO network sector for a given device type to a MU-MIMO sector when the average MU-MIMO gain for the device type exceeds a threshold. The MIMO applications may process SU-MIMO gains to determine geofence modifications. For example, the MIMO applications may change a MU-MIMO network sector for a new device type to an SU-MIMO network sector when the average MU-MIMO gain falls below the average SU-MIMO gain by a threshold. The MIMO applications transfer the geofence modifications to wireless access points 111-112. Advantageously, wireless communication network 100 efficiently and effectively supports MU-MIMO for several different wireless user devices that have several different device types.

Figure 2:
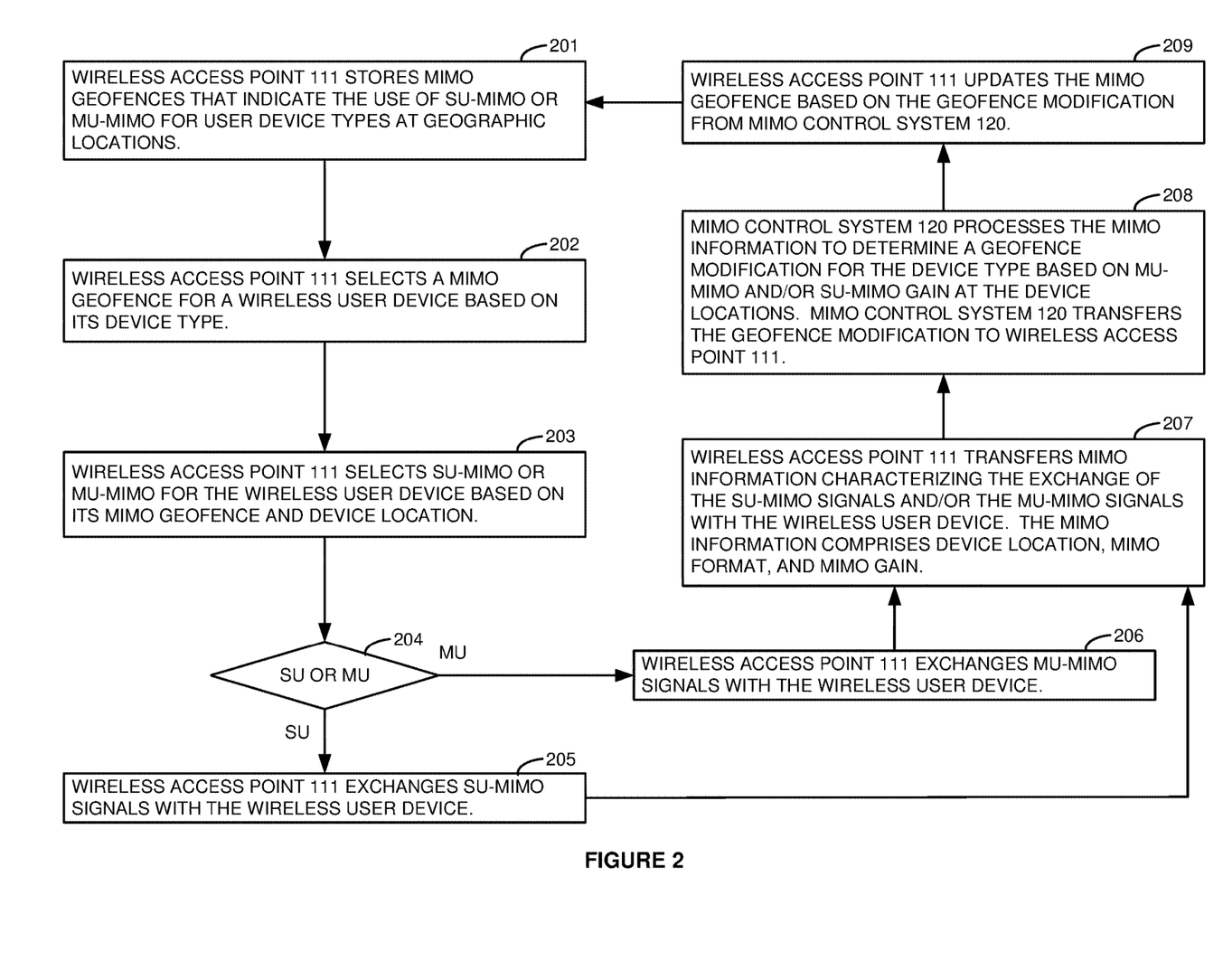
FIG. 2 illustrates the operation of the wireless communication network to optimize MIMO for the different types of wireless user devices.

FIG. 2 illustrates the operation of wireless communication network 100 to optimize MIMO for a wireless user device. The operation of wireless access point 111 for a single user device is described, and the operation of wireless access points 111-112 for additional wireless user devices is similar. Wireless access point 111 stores MIMO geofences (201). The MIMO geofences indicate the use of SU-MIMO or MU-MIMO per device type and location. Wireless access point 111 selects a MIMO geofence for the wireless user device based on its device type (202). Wireless access point 111 then selects SU-MIMO or MU-MIMO for the wireless user device based on the selected MIMO geofence and the device location (203). When the device type and the device location indicate SU-MIMO (204), then wireless access point 111 exchanges SU-MIMO signals with the wireless user device (205). When the device type and the device location indicate MU-MIMO (204), then wireless access point 111 exchanges MU-MIMO signals with the wireless user device (206).

Wireless access point 111 transfers MIMO information that characterizes the exchange of the SU-MIMO signals and/or the MU-MIMO signals with the wireless user device (207). The MIMO information comprises device location, MIMO format, MIMO gain, and possibly other information. MIMO control system 120 processes the MIMO information to determine a geofence modification (if any) for the device type based on the MU-MIMO gain and/or the SU-MIMO gain at the device locations (208). MIMO control system 120 transfers the geofence modification to wireless access point 111. Wireless access point 111 updates its MIMO geofence for the device type based on the geofence modification from MIMO control system 120 (209). The operation repeats.

Figure 3:
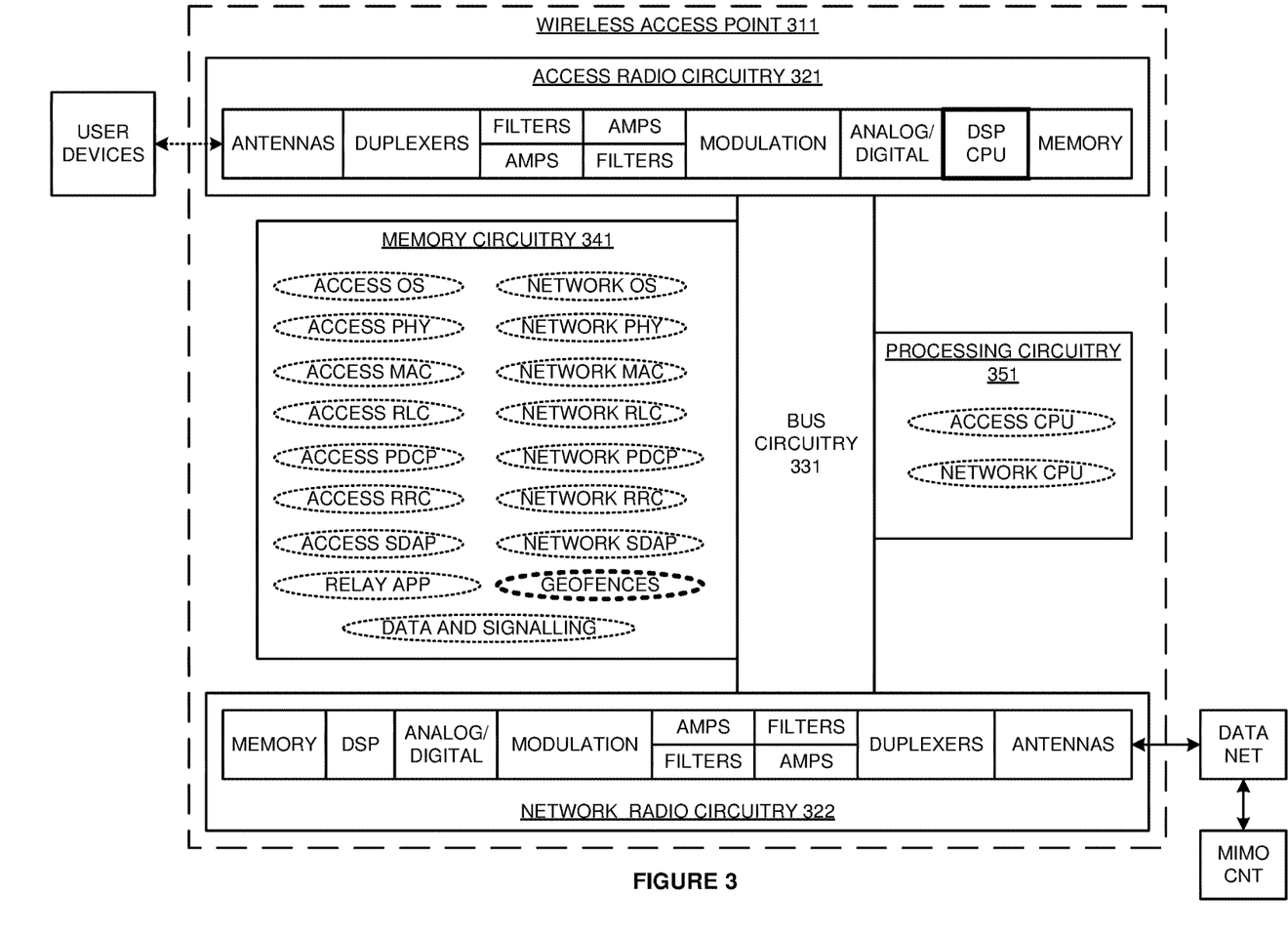
FIG. 3 illustrates a wireless access point to optimize MIMO for different types of wireless user devices.

FIG. 3 illustrates wireless access point 311 to optimize MIMO for different types of wireless user devices. The hardware/software architecture of wireless access point 311 is exemplary and other architectures could be used. For example, wireless access point 311 uses wireless backhaul in this example, but wireless access point 311 may use wireline backhaul in other examples. Wireless access point 311 comprises radio circuitry 321-322, bus circuitry 331, memory circuitry 341, processing circuitry 351. Bus circuitry 331 couples radio circuitry 321-322, memory circuitry 341, and processing circuitry 351. Memory circuitry 331 stores operating systems, relay application, MIMO geofences, user data, and network signaling. Memory circuitry 331 also stores a Physical Layer (PHY), Media Access Control (MAC), Radio Link Control (RLC), Packet Data Convergence Protocol (PDCP), Radio Resource Control (RRC), Service Data Application Protocol (SDAP) for both user access and network communications.

Radio circuitry 321-322 comprises antennas, duplexers, filters, amplifiers, modulators, analog/digital interfaces, DSP/CPUs, and memory. The antennas in access radio circuitry 321 exchange wireless data with wireless user devices. These access antennas are typically massive antenna arrays such as 64×64, 128×128, and the like. The DSP/CPUs in radio circuitry 321 execute firmware/software to drive the exchange of data between the access antennas and the memory in radio circuitry 321. The access CPU in processing circuitry 351 executes the access operating system and the access applications to drive the exchange of data between the radio circuitry 321 memory and memory circuitry 341. Moreover, the access CPU executes access applications like PHY, MAC, and RRC to control MU-MIMO and SU-MIMO for wireless user devices based on their device type and location.

In processing circuitry 351, the access CPU and/or the network CPU execute the relay application to drive the exchange of data between the access RRC/SDAP and the network RRC/SDAP. The relay application aggregates UL user data and network signaling from the access RRC/SDAP as "relay data" for the network RRC/SDAP to transfer to the wireless data network. The relay application distributes DL "relay data" from the network RRC/SDAP as user data and network signaling for the access RRC/SDAP to transfer to the wireless user devices.

The network CPU executes the network operating system and the network applications to drive the exchange of data between memory circuitry 341 and the memory in network radio circuitry 322. In network radio circuitry 322, the DSP/CPUs execute firmware/software to drive the exchange of data between the radio circuitry 322 memory and the antennas. The radio circuitry 322 antennas wirelessly exchange user data and network signaling with a wireless data network. In some examples, network radio circuitry 322 could be replaced or augmented with a wireline transceiver.

In access radio circuitry 321, the antennas receive wireless Uplink (UL) signals from the wireless user devices and transfer corresponding electrical UL signals through the duplexers to the amplifiers. The amplifiers boost the UL signals for filters which attenuate unwanted energy. In modulation, demodulators down-convert the UL signals from their carrier frequencies. The analog/digital interfaces convert the analog UL signals into digital UL signals for the DSP/CPUs. The DSP/CPUs recover UL data and signaling from the UL signals and store the UL data and signaling in the memory. The DSP/CPUs transfer the recovered UL data and signaling from the memory to memory circuitry 341. The access, relay, and network applications process the UL data and signaling in memory circuitry 341 and transfer the UL data and signaling to the memory in network radio circuitry 322.

In network radio circuitry 322, the memory receives the processed UL data and signaling from memory circuitry 341. The DSP/CPUs generate UL signals from the UL data and signaling. The DSP/CPUs transfers corresponding UL signals to the analog/digital interface. The analog/digital interface converts the digital UL signals into analog UL signals for the modulators. The modulators up-convert the UL signals to their carrier frequencies. The amplifiers boost the UL signals for the filters which attenuate unwanted out-of-band energy. The filters transfer the UL signals through the duplexers to the antennas. The electrical UL signals drive the antennas to emit corresponding wireless UL signals to the wireless data network.

In network radio circuitry 322, the antennas receive wireless Downlink (DL) signals from the wireless data network and transfer corresponding electrical DL signals through the duplexers to the amplifiers. The amplifiers boost the DL signals for filters which attenuate unwanted energy. In modulation, demodulators down-convert the DL signals from their carrier frequencies. The analog/digital interfaces convert the analog DL signals into digital DL signals for the DSP/CPUs. The DSP/CPUs recover DL data and signaling from the DL signals and store the DL data and signaling in the memory. The DSP/CPUs transfer the recovered DL data and signaling from the memory to memory circuitry 341. The network, relay, and access applications process the DL data and signaling in memory circuitry 341 and transfer the DL data and signaling to the memory in access radio circuitry 321.

In access radio circuitry 321, the memory receives the processed DL data and signaling from memory circuitry 341. The DSP/CPUs in radio circuitry 321 transfer corresponding DL signals to the analog/digital interface. The analog/digital interface converts the digital DL signals into analog DL signals for the modulators. The modulators up-convert the DL signals to their carrier frequencies. The amplifiers boost the DL signals for the filters which attenuate unwanted out-of-band energy. The filters transfer the DL signals through the duplexers to the antennas. The electrical DL signals drive the antennas to emit corresponding wireless DL signals to the wireless user devices.

For communications with the wireless user devices, the access applications process the user data and network signaling in memory circuitry 341. For communications with the wireless data network, the network applications process the user data and network signaling in memory circuitry 341. The access RRC determines device types for the wireless user devices. The access RRC or MAC determine MIMO geofences per device type. Advantageously, the access RRC or MAC select MU-MIMO or SU-MIMO for wireless user devices based on their device type and location. The access RRC and MAC exchange data indicating device types, locations, MIMO geofences, and/or MIMO SU/MU formats.

The access MAC schedules the MU-MIMO users in shared resource blocks and schedules the SU-MIMO users in dedicated resource blocks. The access MAC directs MIMO processing in the access PHY based on the scheduling. On the DL, the access PHY applies MIMO coding, interleaving, mapping, and precoding for both SU-MIMO and MU-MIMO users based on the access MAC scheduling. On the UL, the access PHY applies MIMO processing, de-mapping, de-interleaving, and decoding for both SU-MIMO and MU-MIMO users based on the access MAC scheduling.

PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, and layer mapping/de-mapping, precoding, Discrete Fourier Transforms (DFTs)/Inverse DFTs (IDFTs), Resource Element (RE) mapping/de-mapping, and Fast Fourier Transforms (FFTs)/Inverse FFTs (IFFTs).

The MACs map between the MAC transport channels and MAC logical channels. MAC functions include buffer status, power headroom, channel quality, Hybrid Automatic Repeat Request (HARQ), user identification, random access, user scheduling, and Quality-of-Service (QoS). The RLCs map between the MAC logical channels and Protocol Data Units (PDUs). RLC functions comprise ARQ, sequence numbering and resequencing, segmentation and resegmentation. The RLCs exchange data and signaling with the PDCPs. The PDCPs map between the PDUs from the RLCs and Service Data Units (SDUs) for the RRCs/SDAPs. PDCP functions comprise security ciphering, header compression and decompression, sequence numbering and re-sequencing, de-duplication. The RRCs exchange SDUs with the PDCPs.

The RRCs handle security and key management, handover operations, status reporting, and QoS. The RRCs interact with wireless network controllers like Mobility Management Entities (MMEs) and/or Access Management Functions (AMFs) to establish and terminate data sessions, receive geofence and modification data, and receive device types and locations. The access RRC supports N1 and Non-Access Stratum (NAS) messaging between the MMEs/AMFs and the wireless user devices. The network RRC supports N1 and Non-Access Stratum (NAS) messaging between the MMEs/AMFs and the relay application. The RRCs exchange user data SDUs with the PDCPs and exchange S1-U user data with network gateways. The access RRC directs the broadcast of system information to the wireless user devices. The access RRC pages the wireless user devices. The SDAPs exchange SDUs with the PDCPs. The SDAPs exchange S3 data with User Plane Functions (UPFs) under the control of Session Management Functions (SMFs). The SDAPs map between the SDUs and the QoS flows and mark the QoS flows with the proper QoS.

In some examples, wireless access point 311 and the wireless data network also use SU-MIMO or MU-MIMO based on device type and device location. In these examples, the network RRC transmits the device type "wireless relay" to the wireless data network. The wireless data network determines the location of wireless access point 311. Advantageously, the wireless data network selects MU-MIMO or SU-MIMO for wireless access point 311 based on the "wireless relay" device type and the location of wireless access point 311. Based on the selections, the wireless data network schedules wireless access point 311 with other MU-MIMO users in shared resource blocks and/or schedules wireless access point 311 as an SU-MIMO user in dedicated resource blocks. The network MAC directs MIMO processing in the network PHY based on the network scheduling. On the UL, the network PHY applies MIMO coding, interleaving, mapping, and precoding for both SU-MIMO and MU-MIMO based on the network scheduling. On the DL, the network PHY applies MIMO processing, de-mapping, de-interleaving, and decoding for both SU-MIMO and MU-MIMO based on the network scheduling.

Figure 4:
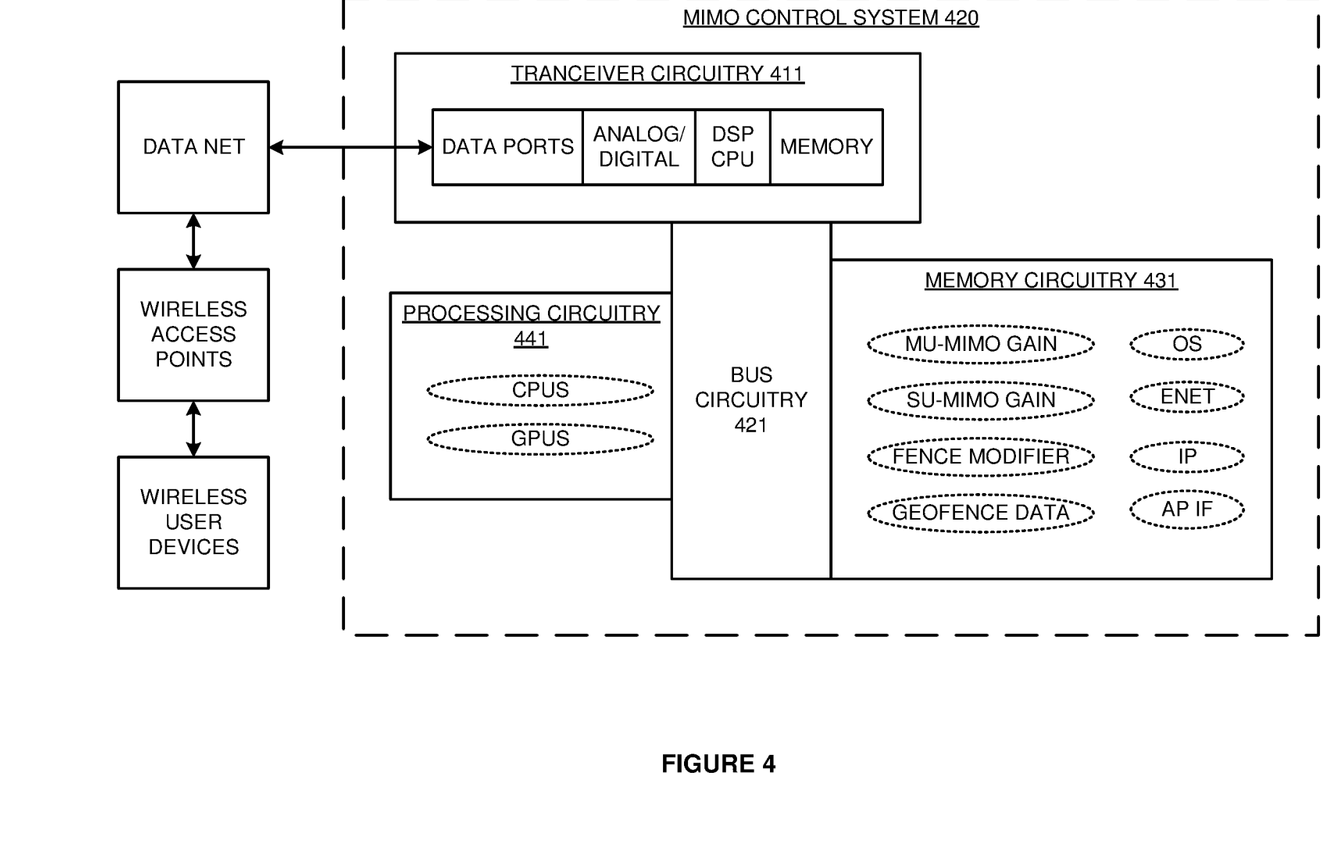
FIG. 4 illustrates a MIMO control system to optimize MIMO for different types of wireless user devices.

FIG. 4 illustrates MIMO control system 420 to optimize MIMO for different types of wireless user devices. The hardware/software architecture of MIMO control system 420 is exemplary and other architectures could be used. MIMO control system 420 comprises transceiver circuitry 411, bus circuitry 421, memory circuitry 431, and processing circuitry 441. Bus circuitry 421 couples transceiver circuitry 411, memory circuitry 431, and processing circuitry 441. Memory circuitry 431 stores an operating system, MU-MIMO gain application, SU-MIMO gain application, fence modifier application, geofence data, wireless access point interface (AP IF) application, ethernet (ENET) application, and internet protocol (IP) application.

Transceiver circuitry 411 comprises data ports, analog/digital interfaces, DSP/CPUs, and memory. The data ports exchange data with wireless access points over one or more data networks. The DSP/CPUs in transceiver circuitry 411 execute firmware/software to drive the exchange of MIMO information between the data ports and the transceiver memory. The CPU/GPUs in processing circuitry 441 execute the ethernet and internet protocol applications to drive the exchange of MIMO information between the transceiver memory and memory circuitry 431.

The CPU/GPUs in processing circuitry 441 execute the MU-MIMO gain application to map MU-MIMO gains to geographic locations per device type. The CPU/GPUs execute the SU-MIMO gain application to map SU-MIMO gains to geographic locations per device type. The CPU/GPUs execute the fence modifier application to modify the geofences per device type based on the MU-MIMO gains and the SU-MIMO gains at the geographic locations. The CPU/GPUs execute the wireless access point interface application to transfer the MIMO geofences and their modifications over the data network to the wireless access points. The exchange of the geofences, MIMO information, and/or geofence modifications may occur through AMFs and/or MMEs in N1, N2, S1-MME, and/or NAS signaling. The wireless access points use the MIMO geofences and their modifications to control the use of MU-MIMO and SU-MIMO per device type and device location for the individual wireless user devices.

In some examples, devices types with good MU-MIMO gain in wireless network sectors should use MU-MIMO in those sectors. Devices types having bad MU-MIMO gain in wireless network sectors should use SU-MIMO in those sectors. In some examples, the MU-MIMO gains are geographically mapped to geographic locations and geographic areas are formed by clustering similar MU-MIMO gains by device type. Good MU-MIMO zones may be specified by geographic coordinates for each device type. Likewise, bad MU-MIMO zones may be specified by geographic coordinates for each device type.

Figure 5:
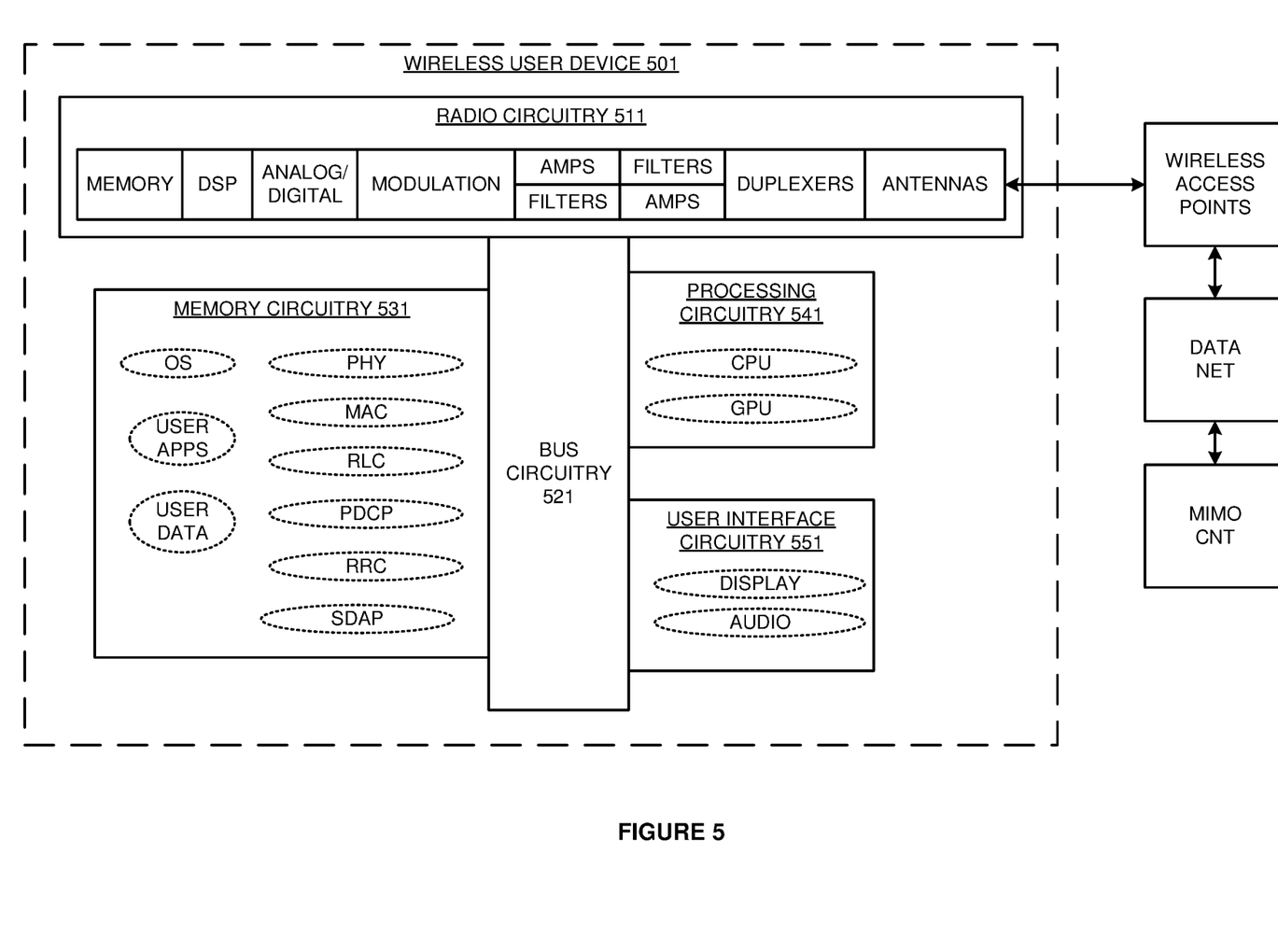
FIG. 5 illustrates a wireless user device having optimized MIMO for its device type.

FIG. 5 illustrates wireless user device 501 having optimized MIMO for its device type. The hardware/software architecture of wireless user device 501 is exemplary and other architectures could be used. Wireless user device 501 comprises radio circuitry 511, bus circuitry 521, memory circuitry 531, and processing circuitry 541, and user interface circuitry 551. Bus circuitry 521 couples radio circuitry 511, memory circuitry 531, processing circuitry 541, and user interface circuitry 551. Memory circuitry 531 stores an operating system, user applications, user data, and network applications like PHY, MAC, RLC, PDCP, RRC, and SDAP.

Radio circuitry 511 comprises antennas, duplexers, filters, amplifiers, modulators, analog/digital interfaces, DSP/CPUs, and memory. The antennas in radio circuitry 511 exchange wireless data with wireless access points. The access antennas may comprise an antenna array such as 4×4, 64×64, and the like. The DSP/CPUs in radio circuitry 511 execute firmware/software to drive the exchange of user data and network signaling between the antennas and the radio circuitry 511 memory. The CPU/GPUs in processing circuitry 541 execute the operating system and network applications (PHY, MAC, RLC, PDCP, RRC, and SDAP) to drive the exchange of data between the radio circuitry 511 memory and memory circuitry 531. Moreover, the CPU/GPUs execute the network applications (PHY, MAC, RRC) to use MU-MIMO and/or SU-MIMO based on device type and location as directed by the wireless access points.

In radio circuitry 511, the antennas receive wireless Downlink (DL) signals from the wireless access points and transfer corresponding electrical DL signals through the duplexers to the amplifiers. The amplifiers boost the DL signals for filters which attenuate unwanted energy. In modulation, demodulators down-convert the DL signals from their carrier frequencies. The analog/digital interfaces convert the analog DL signals into digital DL signals for the DSP/CPUs. The DSP/CPUs recovers DL data and signaling from the DL signals. The DSP/CPUs transfers the recovered DL data and signaling from its memory to memory circuitry 531. The network applications process the DL data and signaling in memory circuitry 531 to recover user data. The user applications process the user data. The user applications may direct the operating system to drive the display and audio in user interface circuitry 551 to present the user data to the user.

The user applications generate user data and direct the operating system to transfer the user data. The CPU/GPUs execute the network applications to transfer the user data and network signaling from memory circuitry 531 to the radio circuitry 511 memory. The DSP/CPUs generate UL signals from the UL data and signaling. The DSP/CPUs transfer corresponding UL signals to the analog/digital interface. The analog/digital interface converts the digital UL signals into analog UL signals for the modulators. The modulators up-convert the UL signals to their carrier frequencies. The amplifiers boost the UL signals for the filters which attenuate unwanted out-of-band energy. The filters transfer the UL signals through the duplexers to the antennas. The electrical UL signals drive the antennas to emit corresponding wireless UL signals to the wireless access points.

The network applications (PHY, MAC, RLC, PDCP, RRC, and SDAP) process user data and network signaling in memory circuitry 341. PHY functions comprise packet formation/deformation, windowing/de-windowing, guard-insertion/guard-deletion, parsing/de-parsing, control insertion/removal, interleaving/de-interleaving, FEC encoding/decoding, rate matching/de-matching, scrambling/descrambling, modulation mapping/de-mapping, channel estimation/equalization, FFTs/IFFTs, channel coding/decoding, and layer mapping/de-mapping, precoding, DFTs/IDFTs, RE mapping/de-mapping, and FFTs/IFFTs.

The MAC maps between the MAC transport channels and MAC logical channels.

MAC functions include buffer status, power headroom, channel quality, HARQ, user identification, random access, user scheduling, and QoS. The RLC map between the MAC logical channels and PDUs. RLC functions comprise ARQ, sequence numbering and resequencing, segmentation and resegmentation. The RLC exchanges data and signaling with the PDCPs. The PDCP maps between the PDUs from the RLCs and SDUs for the RRC/SDAP. The PDCP functions comprise security ciphering, header compression and decompression, sequence numbering and re-sequencing, de-duplication. The RRC exchanges SDUs with the PDCP.

The RRC handles security and key management, handover operations, status reporting, and QoS. The RRC interacts with wireless network controllers like MMEs and/or AMFs to establish and terminate data sessions, receive geofences and modification data, receive device types, and receive device locations. The RRC supports N1 and NAS messaging with MMEs/AMFs. The RRC exchanges user data SDUs with the PDCP and exchanges S1-U user data with data network gateways. The RRC consumes the broadcast of system information. The RRC handles pages. The SDAP exchanges SDUs with the PDCP. The SDAP exchanges S3 data with UPFs under the control of SMFs. The SDAP maps between the SDUs and the QoS flows and marks the QoS flows with the proper QoS.

The RRC transmits the device type for wireless user device 501 to the wireless access points. The wireless access points and/or the data network determine the location of wireless user device 501. Advantageously, the wireless access points or data network select MU-MIMO or SU-MIMO for wireless user device 501 based on its device type and device location. The wireless access points may schedule wireless user device 501 with other MU-MIMO users in shared resource blocks. The wireless access points may schedule wireless user device 501 as an SU-MIMO user in dedicated resource blocks. The MAC directs MIMO processing in the PHY based on the network scheduling. On the UL, the PHY applies MIMO coding, interleaving, mapping, and precoding for SU-MIMO and/or MU-MIMO based on the network scheduling. On the DL, the PHY applies MIMO processing, de-mapping, de-interleaving, and decoding for SU-MIMO and/or MU-MIMO based on the network scheduling.

Figure 6:
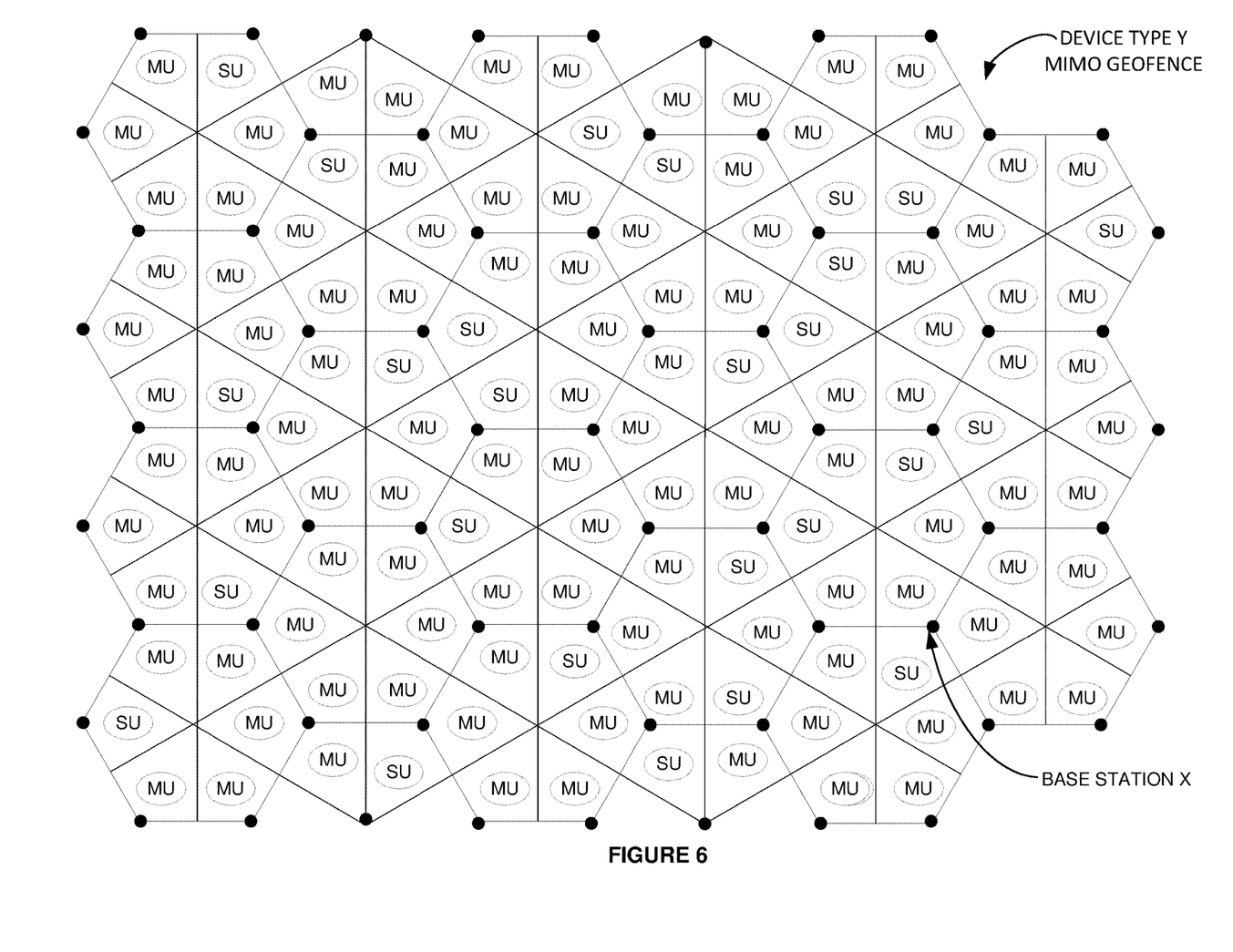
FIG. 6 illustrates a MIMO geofence for an individual device type where the geofence comprises two-dimensional network sectors.

FIG. 6 illustrates a MIMO geofence for device type Y and base station X. The geofences for device type Y at other base stations are also shown. The geofence comprises two-dimensional network sectors and their MIMO formats. The network sectors are formed by the radio coverage of the base stations. Base station X has three sectors where the two sectors are MU-MIMO for device type Y, and one sector is SU-MIMO for device type Y. Similar geofences would be developed for other device types. The geofences could be a list of sectors and their MIMO formats for the device types at base station X.

Figure 7:
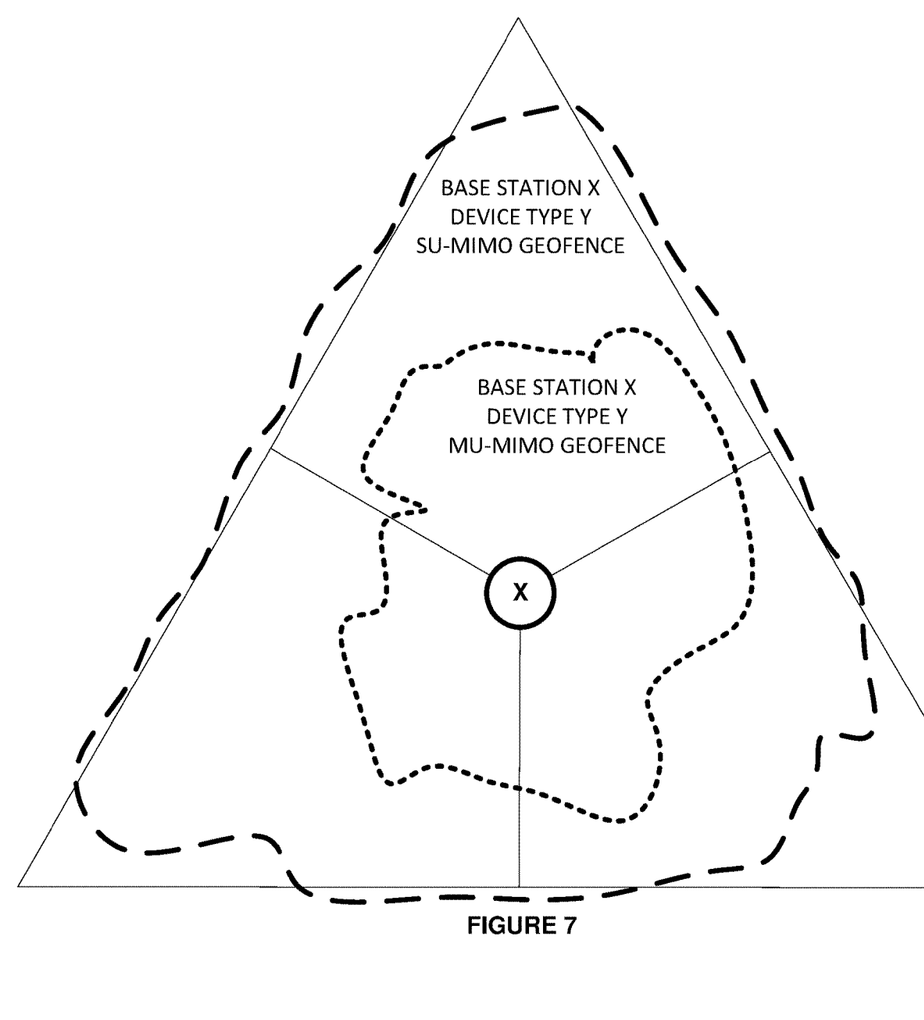
FIG. 7 illustrates a MIMO geofence for an individual device type where the geofence comprises geographic coordinates for two-dimensional geographic areas.

FIG. 7 illustrates a MIMO geofence for device type Y at base station X. The geofence comprises geographic coordinates for two-dimensional geographic areas. The geographic coordinates could be latitude and longitude for various points around the areas. Although the areas are depicted as rough circles, other shapes could be used. The geofences could be a list of coordinates and their MIMO formats for device type Y at base station X.

Figure 8:
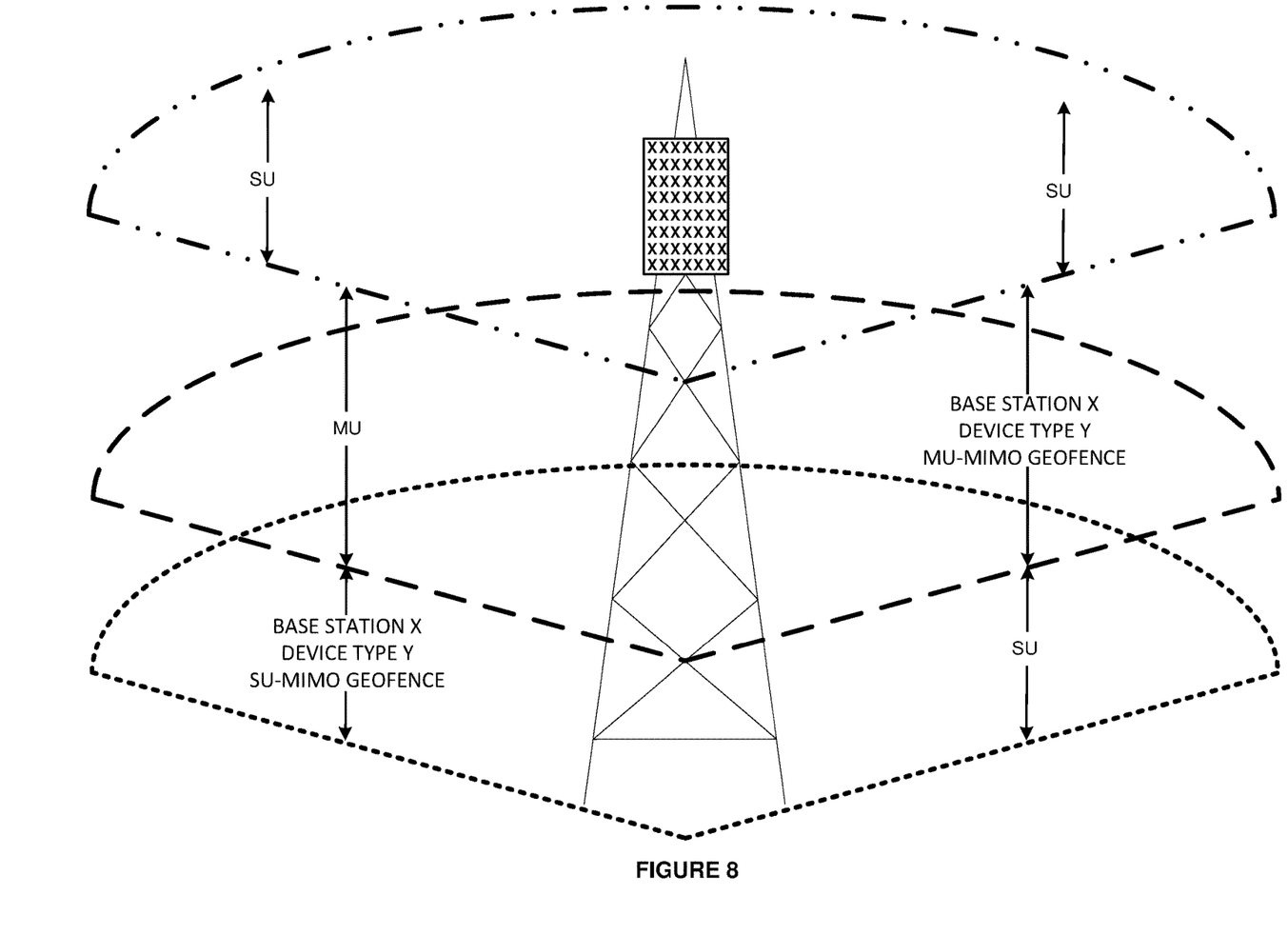
FIG. 8 illustrates a MIMO geofence for an individual device type where the geofence comprises three-dimensional network sectors.

FIG. 8 illustrates a MIMO geofence for device type Y at base station X. The geofence comprises three-dimensional network sectors. The network sectors are formed by the radio coverage of the base station at different elevations. Base station X has three sectors where the bottom and top sectors are SU-MIMO for device type Y and the middle sector is MU-MIMO for device type Y. Similar geofences would be developed for other device types. The geofences could be a list of sectors and their MIMO formats for the device types at base station X.

Figure 9:
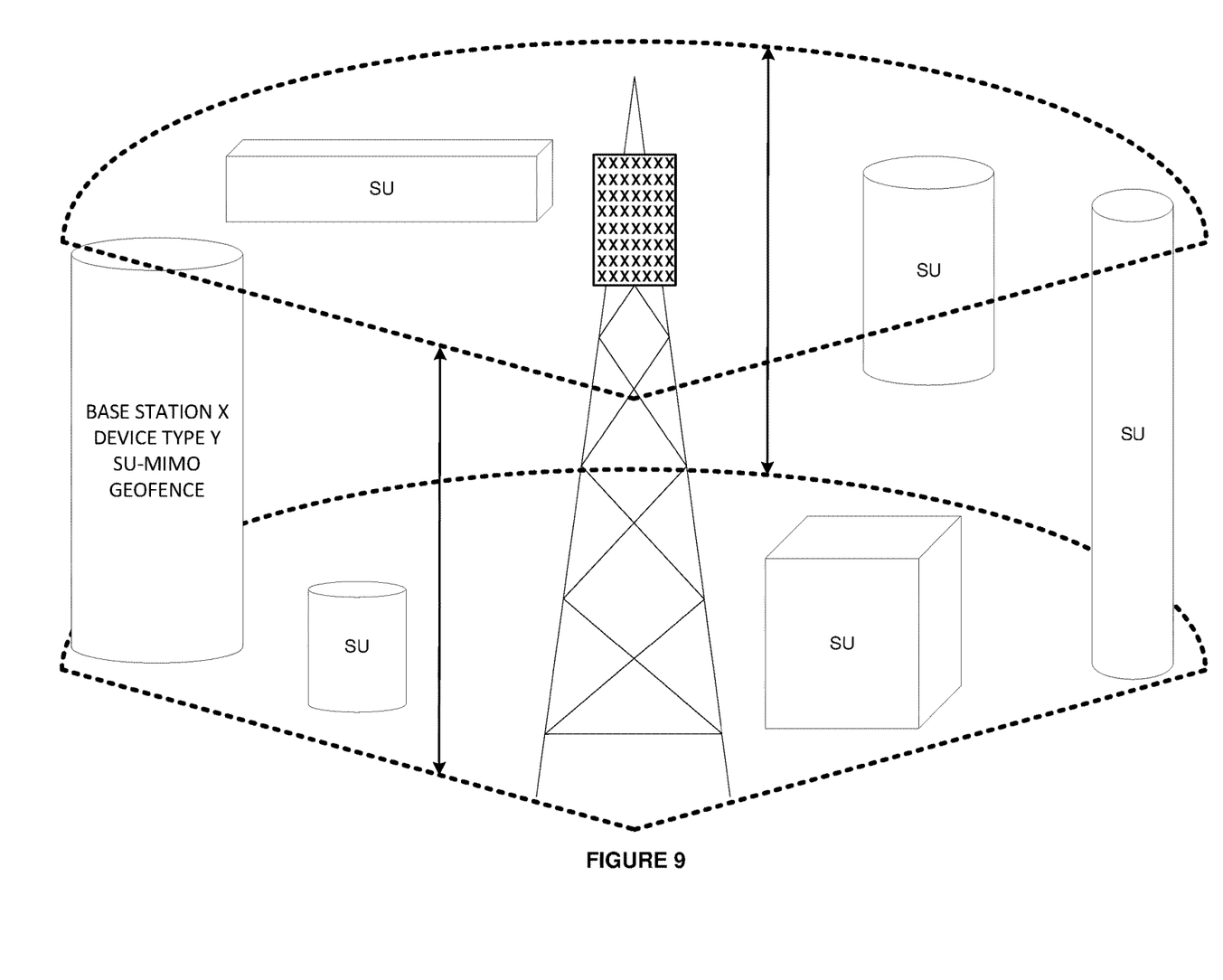
FIG. 9 illustrates MIMO geofence for an individual device type where the geofence comprises geographic coordinates for three-dimensional geographic areas.

FIG. 9 illustrates a MIMO geofence for device type Y at base station X. The geofence comprises geographic coordinates for three-dimensional geographic volumes and their MIMO formats. Although the volumes are depicted as boxes and cylinders, other shapes could be used. The geographic coordinates could be latitude, longitude, and elevation for various points around the volume. The geofences could be a list of coordinates and their MIMO formats for the device types at base station X.

The wireless data network circuitry described above comprises computer hardware and software that form a special-purpose machine—wireless access points and MIMO control systems that optimize MIMO per user device type. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose wireless access points and MIMO control systems that optimize MIMO for different types of wireless user devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to enhance Multiple Input Multiple Output (MIMO) for wireless user devices having multiple device types, the method comprising:

wireless access points storing MIMO geofences for the device types, selecting the MIMO geofences for the wireless user devices based the device types, exchanging Single User (SU) MIMO signals and Multiple User (MU) MIMO signals with the wireless user devices based on the selected MIMO geofences and device locations, and transferring MIMO information characterizing the exchange of the MU MIMO signals and the SU MIMO signals;

a MIMO control system processing the MIMO information, determining geofence modifications based on MU-MIMO gains and SU-MIMO gains for the device types at the device locations, and transferring the geofence modifications to the wireless access points; and the wireless access points updating the MIMO geofences based on the geofence modifications.

2. The method of claim 1 wherein the MIMO geofences indicate two-dimensional network sectors that should use MU-MIMO for a subset of the device types.

3. The method of claim 1 wherein the MIMO geofences indicate two-dimensional network sectors that should use SU-MIMO for a subset of the device types.

4. The method of claim 1 wherein the MIMO geofences indicate two-dimensional geographic areas that should use MU-MIMO for a subset of the device types.

5. The method of claim 1 wherein the MIMO geofences indicate two-dimensional geographic areas that should use SU-MIMO for a subset of the device types.

6. The method of claim 1 wherein the MIMO geofences indicate three-dimensional network sectors that should use MU-MIMO for a subset of the device types.

7. The method of claim 1 wherein the MIMO geofences indicate three-dimensional network sectors that should use SU-MIMO for a subset of the device types.

8. The method of claim 1 wherein the MIMO geofences indicate three-dimensional geographic volumes that should use MU-MIMO for a subset of the device types.

9. The method of claim 1 wherein the MIMO geofences indicate three-dimensional geographic volumes that should use SU-MIMO for a subset of the device types.

10. A wireless communication network to enhance Multiple Input Multiple Output (MIMO) for wireless user devices having multiple device types, the wireless communication network comprising:

wireless access points configured to store MIMO geofences for the device types, select the MIMO geofences for the wireless user devices based the device types, exchange Single User (SU) MIMO signals and Multiple User (MU) MIMO signals with the wireless user devices based on the selected MIMO geofences and device locations, and transfer MIMO information characterizing the exchange of the MU-MIMO signals and the SU MIMO signals;

a MIMO control system configured to process the MIMO information, determine geofence modifications based on MU-MIMO gains and SU-MIMO gains for the device types at the device locations, and transfer the geofence modifications to the wireless access points; and the wireless access points configured to update the MIMO geofences based on the geofence modifications.

11. The wireless communication network of claim 10 wherein the MIMO geofences indicate two-dimensional network sectors that should use MU-MIMO for a subset of the device types.

12. The wireless communication network of claim 10 wherein the MIMO geofences indicate two-dimensional network sectors that should use SU-MIMO for a subset of the device types.

13. The wireless communication network of claim 10 wherein the MIMO geofences indicate two-dimensional geographic areas that should use MU-MIMO for a subset of the device types.

14. The wireless communication network of claim 10 wherein the MIMO geofences indicate two-dimensional geographic areas that should use SU-MIMO for a subset of the device types.

15. The wireless communication network of claim 10 wherein the MIMO geofences indicate three-dimensional network sectors that should use MU-MIMO for a subset of the device types.

16. The wireless communication network of claim 10 wherein the MIMO geofences indicate three-dimensional network sectors that should use SU-MIMO for a subset of the device types.

17. The wireless communication network of claim 10 wherein the MIMO geofences indicate three-dimensional geographic volumes that should use MU-MIMO for a subset of the device types.

18. The wireless communication network of claim 10 wherein the MIMO geofences indicate three-dimensional geographic volumes that should use SU-MIMO for a subset of the device types.

* * * * *